United States Patent [19]

Anderson, Jr.

[11] 4,108,336
[45] Aug. 22, 1978

[54] PROBE FOR EXTRACTING TOXIC FLUIDS FROM AN HERMETICALLY SEALED CONTAINER

[76] Inventor: David L. Anderson, Jr., 23799 Monterey Salinas Hwy. Unit #51, Salinas, Calif. 02889

[21] Appl. No.: 807,823

[22] Filed: Jun. 20, 1977

[51] Int. Cl.² ............................................. B67D 5/02
[52] U.S. Cl. ............................ 222/148; 134/168 R; 141/91; 222/484
[58] Field of Search ................ 222/400.7, 148, 478, 222/481, 484; 141/90-92; 137/205, 212, 588; 134/103, 168 R

[56] References Cited

U.S. PATENT DOCUMENTS

| 3,348,734 | 10/1967 | Rice et al. ............... | 222/148 X |
| 3,916,924 | 11/1975 | McGowan ................. | 134/168 R |
| 3,923,203 | 12/1975 | Anderson, Jr. ............ | 222/484 X |

Primary Examiner—Stanley H. Tollberg
Assistant Examiner—David A. Scherbel
Attorney, Agent, or Firm—Huebner & Worrel

[57] ABSTRACT

A method and a probe adapted to be inserted into a socket valve for an hermetically sealed container having confined therein a body of toxic fluid. The probe is characterized by a cylindrical configuration adapted to be telescopically inserted into a tubular sleeve of a socket valve and supported thereby for rotation relative thereto for thus opening and closing the valve, a container vent for introducing atmospheric pressure into the container as toxic fluid is extracted therefrom, and for washing residue from the internal surfaces of the container subsequent to extraction of the toxic fluid from the container.

2 Claims, 9 Drawing Figures

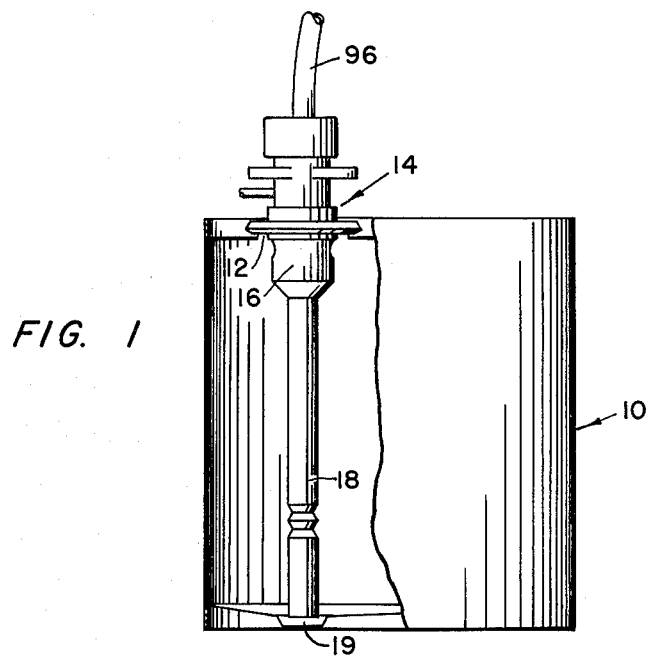
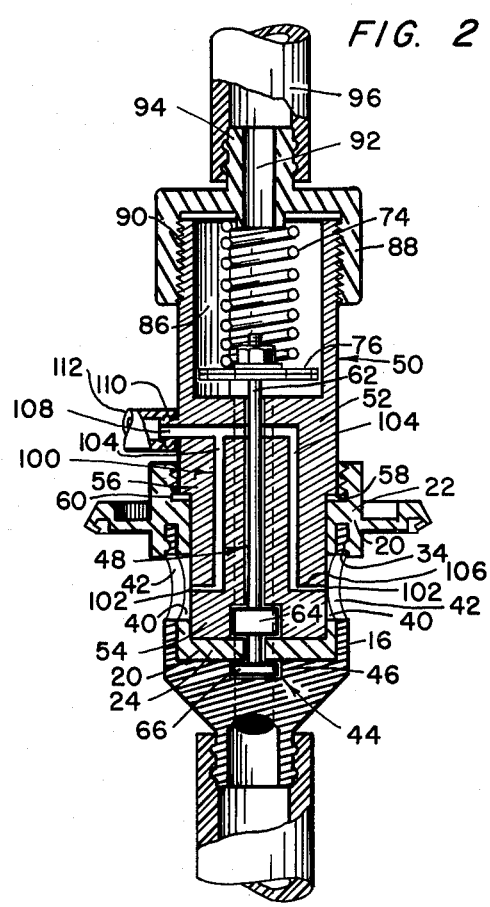
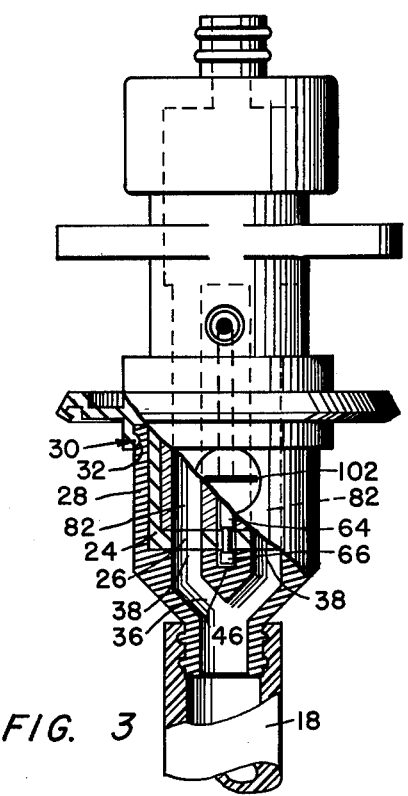

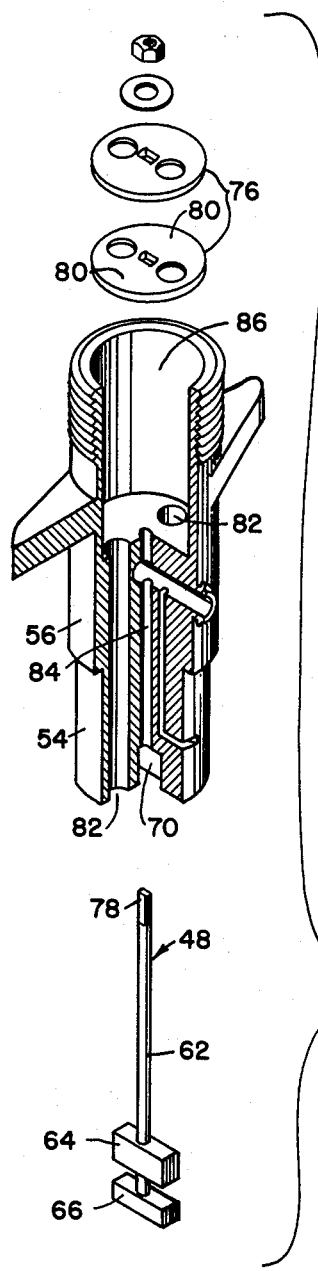
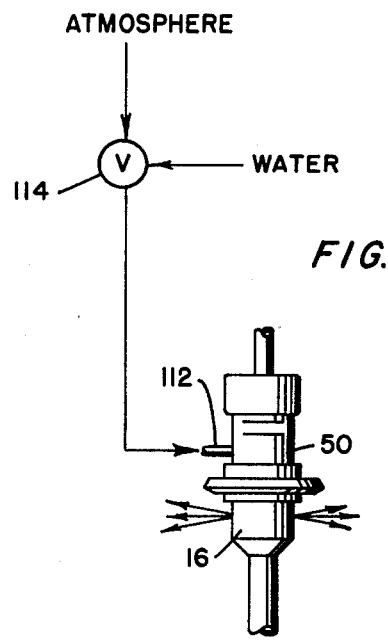
FIG. 6
FIG. 4
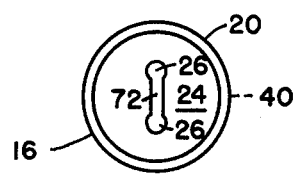
FIG. 5

PROBE FOR EXTRACTING TOXIC FLUIDS FROM AN HERMETICALLY SEALED CONTAINER

BACKGROUND OF THE INVENTION

1. Field of the Invention

The invention generally relates to a method and a device used to open and close the discharge orifice of a sealed container, and more particularly to an improved method and probe for sequentially extracting toxic fluid from the container and washing residue of toxic fluid from the walls of the container.

As more fully discussed in United States Letters Pat. No. 3,923,203, to David L. Anderson, incorporated herein by reference thereto, in the field of agriculture large acreages must be treated through an application of suitable diluted toxic chemicals for effectively destroying noxious plants, insects and the like. As also disclosed, it is common practice to transport toxic chemicals in concentrated liquid form to or near a situs of use and thereafter dilute the toxic chemical employing water and the like.

2. Description of the Prior Art

Mixing of the chemicals normally is achieved employing mixing tanks and the like through which a diluting fluid, such as water, continuously is re-circulated. Unfortunately, as can readily be appreciated by those familiar with the use of toxic chemicals employed in agricultural endeavors, contamination resulting from a spillage of herbicides, insecticides or the like may result in handlers being seriously injured.

In order to overcome apparent dangers attending the handling of insecticides, herbicides and the like, a bimodal tap particularly adapted to be seated in the discharge orifice of a container, such as a point of sale container, for facilitating transfer of toxic liquid, without spillage, is disclosed and claimed in the aforementioned United States Letters Patent. While the bimodal tap aforementioned functions satisfactorily for its intended purposes, it is possible for handlers, when operating under some unlikely conditions which may attend the use of the tap, to be subjected to contamination from residue found within empty containers.

It is therefore the general purpose of the instant invention to provide an improved method and a probe for sequentially extracting toxic fluid from a container and thereafter in washing residue of toxic fluid from the walls of the container in a safe and economic manner.

OBJECTS AND SUMMARY OF THE INVENTION

It is an object of the instant invention to provide an improved method and probe for extracting toxic fluids from hermetically sealed containers.

It is another object to provide an improved method for extracting toxic fluid from a container and thereafter spray washing the internal surface of the container.

Another object is to provide a probe particularly adapted to be inserted into an hermetically sealed container for toxic fluid and sequentially employed for first extracting toxic fluid from the container and thereafter washing residue of the toxic fluid from the walls of the container.

Another object is to provide an improved probe adapted to be employed in extracting toxic fluid from containers while introducing atmospheric pressure into the container and thereafter employed for washing residue from the walls of the container.

These and other objects and advantages are achieved through the use of a probe adapted to be inserted into a socket valve for an hermetically sealed container for toxic fluid and to be employed for sequentially extracting toxic fluid from the container and washing residue of the toxic fluid from the internal walls of the container, characterized by a body of a cylindrical configuration adapted to be telescopically inserted into a tubular sleeve of a socket valve and supported thereby for angular displacement relative thereto, including at least one bore extended through the body of the probe and adapted to communicate with at least one opening formed in the socket valve for collectively defining an extraction conduit for toxic fluid confined within the container, slotted openings defined in the cylindrical surface of the body of the probe for admitting atmospheric pressure, a conduit adapted to connect the slotted openings with atmospheric pressure, including a network of passageways communicating with the slotted openings, and for connecting the slotted opening in communication with a fluid under pressure for washing residue from the internal surfaces of the container, as will become more readily apparent by reference to the following description and claims in light of the accompanying drawings.

BRIEF DESCRIPTION OF THE DRAWINGS

FIG. 1 is a side elevation of a container having a tap including a socket valve mounted in the discharge orifice of a container, and a probe embodying the principles of the instant invention seated in the socket valve.

FIG. 2 is a vertically sectioned view of the tap shown in FIG. 1.

FIG. 3 is a partially sectioned side elevational view of the tap shown in FIG. 2, but rotated 90° with respect to the orientation thereof.

FIG. 4 is an exploded, partially sectioned perspective view of the probe shown in FIGS. 1, 2 and 3.

FIG. 5 is a top-plan view of the socket valve shown in FIGS. 1, 2 and 3, but with the probe having been removed.

FIG. 6 is a diagrammatic view illustrating an operational mode for the tap.

DESCRIPTION OF THE PREFERRED EMBODIMENT

Figure 7:
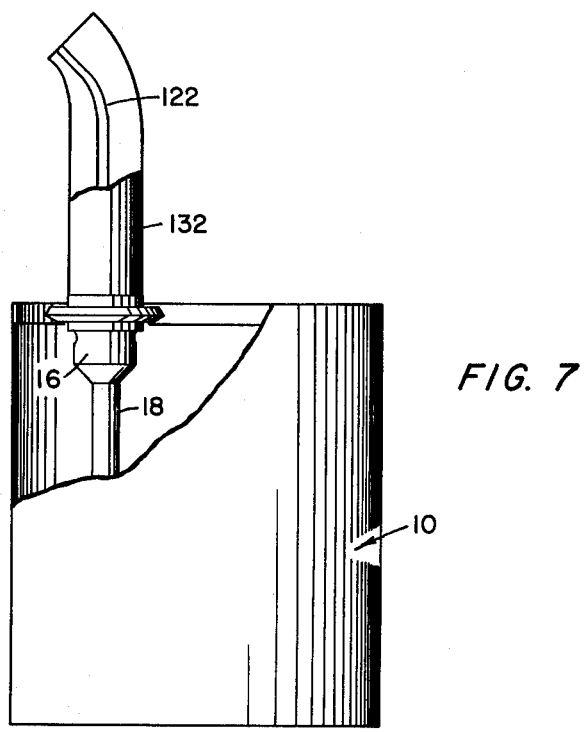
FIG. 7 is a modified form of the tap shown in FIG. 1, including a modified probe.

Referring now with more particularity to the drawings wherein like reference characters designate like or corresponding parts throughout the several views, there is shown in FIG. 1 a point of sale container, generally designated 10.

The container 10 serves for confining a toxic liquid such as a herbicide, insecticide and the like. As shown, the container 10 includes a discharge orifice 12 having seated therein a tap, generally designated 14. The tap 14 includes a socket valve 16 having a siphon tube 18 connected to the socket valve and extended downwardly to a plane of termination in close proximity with a collection well 19 formed within the bottom of the container. As a practical matter, the bottom of the container 10 is inclined toward the collection well 19 so that even small quantities of liquid within the container 10 tends to pool in close proximity with the distal end of the siphon tube 18 for facilitating complete extraction.

As a practical matter, the socket valve 16 includes a socket 20 of a sleeve-like configuration integrally related with a radially extended collar 22, the purpose of which is to couple the socket valve 16 within the discharge orifice 12 of the container 10. While the particular manner in which the collar 22 is attached to the container forms no specific part of the instant invention, it is to be understood that the collar 22 is joined to the container by crimping or the like, for thus establishing an hermetic seal therebetween. Additionally, the socket 20 includes an internal thread for purposes of receiving a cap, not shown. The cap is fully described in the aforementioned United States Letters Patent.

As best shown in FIG. 3, the socket 20 includes a closure plate 24 having defined therein a pair of ports or orifices 26, FIG. 5, while a closure block 28 is concentrically related to the socket 20 and supported thereby for angular displacement relative thereto. An annular bearing 30, including an annular rib 32 seated within an annular groove formed in the external surface of the socket 20, is provided for coupling the block 28 to the socket 20.

It is important to note that the closure block 28 is provided with a bifurcated bore 36 terminating in ports designated 38, adapted to be brought into registry with the ports 26 by rotating the closure block 28. It will, of course, be understood that the bifurcated bore 36 communicates with the siphon tube 18 and facilitates extraction of fluid from the container through the top. It should be apparent that angular displacement of the closure block 28, relative to the socket 20, causes the ports 26 to open or close, depending upon the direction and extent of angular displacement imparted to the closure block 28 relative to the sleeve.

Additionally, it is important to note that the socket 20 also includes a pair of axially aligned, diametrically opposed ports 40, while the closure block 28 includes a pair of coaxially aligned, diametrically opposed ports 42. Moreover, it is important to appreciate that the ports 42 are brought into registry with the ports 40 at the same time the ports 38 are brought into registry with the ports 26 in response to angular displacement of the closure block 28.

Angular displacement is imparted to the closure block 28 through a key and keyway coupling, generally designated 44, FIG. 2. This coupling includes a keywell 46 transversely related to a plane of symmetry passing through the ports 38, as best illustrated in FIG. 3, and serves to receive an elongated key 48 projected axially from a probe, generally designated 50, as the probe is mated with the socket 20 of the valve 16.

The probe 50 includes an elongated body 52 including a first cylindrical segment 54 of a diameter substantially equal to the internal diameter of the socket 20, and a second cylindrical segment 56 of a slightly greater diameter separated from the first segment by a shoulder 58. The shoulder 58 seats on a washer or similar seal 60 for thus assuring that a snug fit is achieved as the probe 50 is inserted into the socket in mated relation therewith.

The key 48, FIG. 4, includes a stem 62 having defined at one end thereof a pair of transversely oriented flukes 64 and 66. The flukes 64 are configured to be received within a slotted chamber 70 simultaneously with the flukes 66 being received within the keywell 46 of the closure block 28. As a practical matter, a slot 72, FIG. 5, formed in the closure plate 24 of the socket 20 and facilitates extension of the key 48 through the closure plate and into the keywell 46.

It is important to note that the key 48 is spring biased toward an extended relation with the body 52 of the probe 50 by a compression spring 74 seated on a ported sealing disk 76. The sealing disk 76 seats on a shoulder formed at one end of the stem 62 of the key, designated 78, and is secured in place by a nut and washer subassembly, not designated. However, it is to be understood that the sealing disk 76 is rigidly affixed to the key 48 and forms an integral part thereof.

Additionally, it is important to note that the ported sealing disk 76 comprises a pair of plates having coaxially aligned openings between which is provided a pair of non-ported surface areas 80 the purpose of which is to seal bores 82. The bores 82 are extended through the body 52 of the probe 50 in parallelism with a concentric bore 84 through which extends the stem 62 of the key 48 and serve as discharge bores through which toxic fluid is discharged from the container 10.

As a practical matter, the spring 74 and the sealing disk 76 are received within a chamber 86 concentrically formed in the body 52 of the probe 50, while the spring 74 is secured in place by a ported cap 88 affixed to the body 52 employing screw threads 90 or the like. A bore 92 is extended coaxially from the cap 88 and serves as a discharge conduit through which fluid flows from the probe to a mixing system, not shown. As a practical matter, a nipple 94 is provided for coupling a flexible tube 96 to the cap 88 in communication with the bore 92.

Additionally, it is to be understood that the stem 62 of the key 48 is of a length greater than the combined length of the chamber 70 and the bore 84 through which the stem extends. Thus the key 48 is permitted to bottom-out in the keywell 46, as the probe 40 is inserted into the socket 20 of the valve 16. The stem 62, of course, is advanced into the chamber 86 for lifting the closure disk 76 from its seat as the key bottoms-out. The bores 82 are thus placed in communication with the bore 92, through the chamber 86.

As more particularly described in the aforementioned patent, the probe 50 is coupled with the socket valve 16 simply by inserting the body 52 into the socket 20, whereupon the key 48 extends through the slot 72 and bottoms-out in the keywell 46. Simultaneously, the stem 62 lifts the sealing disk 76 from its seat, out of sealing relationship with the bores 82. Angular displacement now imparted to the body 52 causes the fluke 66 to extend transversely with respect to the slot 72 for thus effecting a coupling of the probe 50 with the socket 20 of the valve 16. Rotation of the body 52 for effecting the coupling aforementioned, simultaneously causes the bores 82 and ports 38 to achieve a registered relationship with the ports 26. Thus the tubing 92 is placed in communication with the bottom portion of the container 10 through the siphon tube 18.

However, in order to facilitate siphoning of the toxic contents of container 10, through the tubing 96, it is necessary to introduce atmospheric pressure into the container 10 as the fluid is extracted. This is achieved by providing a network of passageways, generally designated 100, which terminate in slotted nozzles 102 formed in the cylindrical surface of the body 52, in coaxial alignment with the ports 40 and 42.

As a practical matter, the network of passageways 100 includes a pair of passage segments 104 extended in parallelism with the concentric bore 84 and communicating with radially extended passage segments 106 which serve to place the segments 104 in communication with the nozzles 102. Additionally, passage segments 104 communicate with an entry bore 108 extended diametrically into the body 52. The bore 108 terminates in a nipple 110 located above the collar 22, when the probe 50 is mated with the socket valve 16.

It will therefore be understood that the entry bore 108 is, during periods of extraction of fluid from the container 10 placed in communication with atmospheric pressure transmitted through the network of passageways 100 into the container 10, via the nozzles 102.

As illustrated in FIG. 6, a length of tubing 112 is, preferably, connected with the probe 50 at the nipple 110 and serves to connect the network of passageways 100 in communication with a three-way valve 114. The valve 114 is of any suitable design but, preferably, includes a first port, not shown, through which atmospheric pressure is introduced into the tubing 112 and a second port, also not shown, connected to a source of water under pressure so that atmospheric pressure and water may be introduced alternatively into the tubing 112.

Of course, where desired, the tubing 112 is so designed and constructed as simply to be slipped onto and off of the nipple 110 for purposes of coupling the entry bore 108 in direct communication with atmospheric pressure, or, alternatively, a source of water under pressure.

Since both atmospheric pressure and water under pressure are introduced into the container 10 through the entry bore 108 via the network of passageways, the nozzles 102, and the ports 40 and 42, sequential extraction of toxic liquids from the container 10 followed by a spray washing of the internal surfaces of the container 10 is facilitated. Thus it is possible to extract toxic contents from the container 10, and thereafter wash the residue from the walls of the container without breaking an established connection between the probe 50 and the socket valve 16, whereby the container 10 is rinsed prior to being discarded. This affords handlers protection not afforded through a use of currently available systems.

Moreover, it should be apparent that as the connection between the probe 50 and the socket valve 16 is broken, the spring 74 forces the key 48 to extend from the body 52, subsequent to removal of the flukes 66 from the keywell 46. Such extension of the stem 62 permits the sealing disk 76 to again seat and thus seal the bores 82. With the bores 82 thus sealed, toxic fluid present within the tubing 96 is entrapped and drippage is substantially precluded.

OPERATION

It is believed that in view of the foregoing description, the operation of the device will readily be understood, however, the operation is here briefly reviewed.

Upon receiving a container 10, filled with a toxic fluid, such as a herbicide or pesticide, a handler simply removes the closure disk from the sleeve 20, in the manner more fully described in the aforementioned patent. The probe 50 is inserted downwardly into the socket 20 of the valve 16 and angular displacement is imparted to the body 52, the probe 50 for coupling the probe with the socket 20 as the flukes 66 become angularly related with the slot 72 of the closure plate 24. The bores 82, ports 26 and ports 38 are thus caused to register, as are the ports 40 and 42. Simultaneously, the sealing disk 76 is lifted off its seat whereby communication is established between the tubing 96 and the siphon tube 18, via the probe 50 and the socket 20 of the valve 16.

A vacuum now applied to the tubing 96 causes the contents of the container 10 to pass upwardly from the well 19 into the siphon tube 18 and thence through the tubing 96 to a mixing system, not shown. As the fluid is drawn from the container, atmospheric pressure is introduced into the container 10 via the entry bore 108, the network of passageways 100, the nozzles 102 communicating with registered and coaxially aligned bores 40 and 42.

Once the contents of the container 10 have been extracted, by siphoning or the like, the entry bore 108 is connected with a source of water, or other rinsing liquid, maintained under pressure. The rinsing liquid is now discharged through the nozzles 102, as a spray, to impinge against and wash down the internal surface of the wall of the container 10. Residue adhered to the wall is thus removed therefrom and caused to puddle within the collection well 19. A final siphoning operation is employed for removing the puddle rinsing fluid from the container 10 so that the container 10, in effect, is rendered in non-toxic condition. The discharge of rinsing liquid and siphoning operation may be performed sequentially or simultaneously.

In order to break the connection between the probe 50 and the socket 20 of the valve 16, rotation or reversed angular displacement is imparted to the body 52 of the probe 50, in a direction opposite that required for achieving a coupling of the probe with the socket valve. The flukes 64 and 66 of the key 48 are thereby caused to align themselves with the slot 72 formed in the closure plate 24. The probe 50 is now extracted from the socket 20 for permitting the spring 74 to reseat the sealing disk 76 in a sealing relationship with the bores 82, whereupon fluid within the tubing 96 is entrapped therein.

Of course, the seating of the sealing disk 76 occurs rapidly. Consequently, drippage of fluid from the probe 50 is thus substantially eliminated.

ALTERNATE EMBODIMENT

Figure 9:
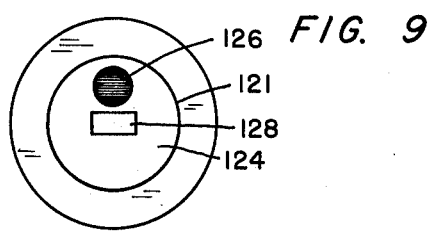
FIG. 9 is a bottom plan view of the tap shown in FIGS. 7 and 8.
Figure 8:
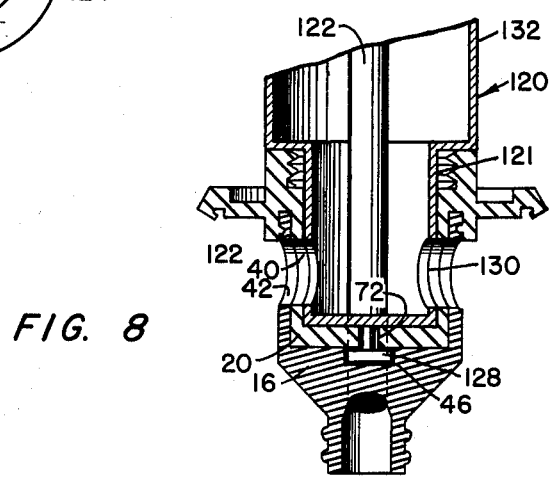
FIG. 8 is a fragmented, vertically sectioned view of the tap shown in FIG. 7.

Attention is now invited to FIGS. 7, 8 and 9 which illustrate an alternate embodiment of the invention.

While the embodiment shown in FIG. 8 differs somewhat from the embodiment previously described, the elements which correspond to those previously discussed in connection with the embodiment invention as shown in FIGS. 1 through 6 are similarly numbered.

The container 10, as shown in FIG. 7, also includes a socket valve 16 which serves to receive a probe 120. The probe 120 includes a cylindrical body 121 having an outside diameter substantially equal to the inside diameter of the socket 20 of the valve 16. The probe 120, however, includes a tubular conduit 122 which functions as a breather tube and terminates in a closure plate 124, FIG. 9, at a port designated 126.

Projected from the closure plate 124 is a key 128 having flukes configured to be passed through the slot 72, of the socket 20, and inserted into the keywell 46 of the closure block 28. It is important to note that the port 126 registers with the port 38 formed in the closure block as the body 121 of the probe is inserted into the socket 20. The probe 120, upon being rotated, repositions the flukes of the key 128 in transverse relation with the slot 72 for thus coupling the probe 120 with the socket 20 of the valve 16. Once the probe 120 is seated in and coupled with the socket 20 the port 126 achieves a coaxially aligned relationship with the port 26, as well as with the port 38.

It is here noted that coaxially aligned ports 130 are formed in the body 121 and are oriented to achieve a coaxially aligned relationship with the ports 42 as the body 121 of the probe 120 is inserted into the socket 20 of the valve 15. Consequently, it can be appreciated that as the probe 120 is angularly displaced for coupling the probe with the closure block 28, the ports 130 achieve a coaxially aligned relationship with the port 40 and 42, simultaneously with the port 126 achieving a registered relationship with the port 26.

The probe 120 terminates in a pouring spout 132, FIG. 7. The spout 132 facilitates a pouring of contents from the container 10 into any suitable receiver as the contents flow from the container to the spout, via the coaxially aligned ports 40, 42 and 130, and atmospheric pressure is introduced through the tube 122 into the container 10 via the port 126 and ports 26 and 38.

It is believed that in view of the preceding description, the operation of the probe 120 clearly is apparent. However, in the interest of clarity it is to be understood that the probe 120 is employed simply by inserting the probe body 121 into the socket 20, with the key 128 being passed through the slot 72 and received in the keywell 46. Angular displacement then imparted to the probe 120 causes the flukes of the key 128 to achieve a transverse orientation relative to the slot 72. The probe is secured to the socket 20 with the ports 130 having achieved a coaxially aligned relationship with the ports 40 and 42. Simultaneously, the port 126 achieves a registered relationship with the ports 26 and 38. Thus, the pouring spout 132 communicates with the interior of the container 10 through the coaxially aligned ports 130, 40 and 42, while the tubular conduit 122 achieves a communicating relationship with the siphon tube 18 through the ports 126, 26 and 38.

In order to employ the probe 120 the container 10 is tipped so that the liquid contents of the container gravitate and enter the ports 42, 40 and 130, and pass through the pouring spout 132 to exit the terminal end thereof. As the liquid contents exits the container 10, atmospheric pressure is introduced into the container via the tubular conduit 122 and the siphon tube 18. It is important to note that the tubular conduit 122 terminates at the discharge end of the probe 120 so that fluid contained within the siphon tube also will be discharged through the discharge end of the probe as the container 10 is tipped for pouring the contents from the spout 132. Thus spillage of the toxic contents is avoided as the contents are discharged from the container via the siphon tube 18 and the tubular conduit 122. However, once the siphon tube 18 is discharged, or thus "drained", the tubular conduit 122 and siphon tube 18 collectively establish a breather conduit through which atmospheric pressure is introduced into the container 10.

In view of the foregoing, it should readily be apparent that the method and probe of the instant invention provides a practical solution to the perplexing problem of facilitating a safe handling of toxic fluids.

Although the invention has been herein shown and described in what is conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A probe adapted to be inserted into a socket valve for an hermetically sealed container characterized by a tubular body adapted to be sealed in a discharge orifice for a container of a body of toxic liquid, a ported closure plate for said tubular body having a first port defined therein, and a ported closure block supported for angular displacement relative to said closure plate disposed in coaxially aligned, contiguous relation with the closure plate having at a second port defined therein registerable with the first port in response to angular displacement imparted to the closure block, comprising:

a cylindrical body adapted to be inserted into the tubular body of said socket valve, means defining a fluid conduit extended through said cylindrical body for conducting a stream of fluid from the container, container vent means including a tubular member defining a passageway extending from said first port to ambient atmosphere, and means for coupling the probe to the socket valve including a key projected from the cylindrical body and adapted to be received by the socket valve in coupling engagement therewith.

2. For use in combination with a socket valve integrally related to an hermetically sealed container and characterized by a cylindrical socket sleeve having defined therein a first pair of coaxially aligned, transversely oriented ports and a closed end defined by a transversely oriented closure plate including therein a first pair of axially oriented diametrically spaced ports, and a concentrically related closure block supported by said sleeve for angular displacement from a valve-close position to a valve-open position and having defined therein a second pair of coaxially aligned transversely oriented ports adapted to register with the first pair of coaxially aligned ports when said closure block is in its valve-open position and a second pair of axially oriented diametrically spaced ports adapted to register with said first pair of axially oriented ports when the closure block is in its valve-open position, a probe comprising:

a probe body of a cylindrical configuration having an external diameter substantially equal to the internal diameter of the socket sleeve adapted to be received in mated relation with said socket sleeve and supported thereby for angular displacement about the longitudinal axis thereof, means defining in said probe body a pair of bores extended in spaced parallelism with said axis and adapted to communicate with said first and second pairs of axially oriented ports for collectively defining an extraction conduit for a fluid confined within the container when said closure block is in its valve-open position, and means for rinsing residue from the internal surface of said container including a pair of slotted openings defined in the cylindrical surface of the probe body disposed in registry with said first and second pair of coaxially aligned ports when said closure block is in its valve-open position, means defining an entry bore extended diametrically between the bores of said pair of bores in vertically spaced relation with said container, a first pair of passage segments extended radially from said pair of slotted openings, a second pair of passage segments extended between said entry bore and said first pair of passage segments for connecting the slotted openings in communication with said entry bore, and means including a nipple seated in said entry bore adapted to connect the entry bore with a source of rinsing fluid maintained under pressure.

* * * * *

UNITED STATES PATENT AND TRADEMARK OFFICE
CERTIFICATE OF CORRECTION

PATENT NO. : 4,108,336
DATED : August 22, 1978
INVENTOR(S) : David L. Anderson, Jr.

It is certified that error appears in the above-identified patent and that said Letters Patent are hereby corrected as shown below:

Column 1, line 17, change "suitable" to ---suitably---.

Column 4, line 37, change "40" to ---50---.

line 56, change "92" to ---96---.

line 60, between "of" and "container", insert ---the---.

Column 6, line 24, change "puddle" to ---puddled---.

Column 7, line 9, change "15" to ---16---.

Signed and Sealed this

Thirteenth Day of March 1979

[SEAL]

Attest:

RUTH C. MASON
*Attesting Officer*

DONALD W. BANNER
*Commissioner of Patents and Trademarks*